3,204,617
PISTON ASSEMBLY

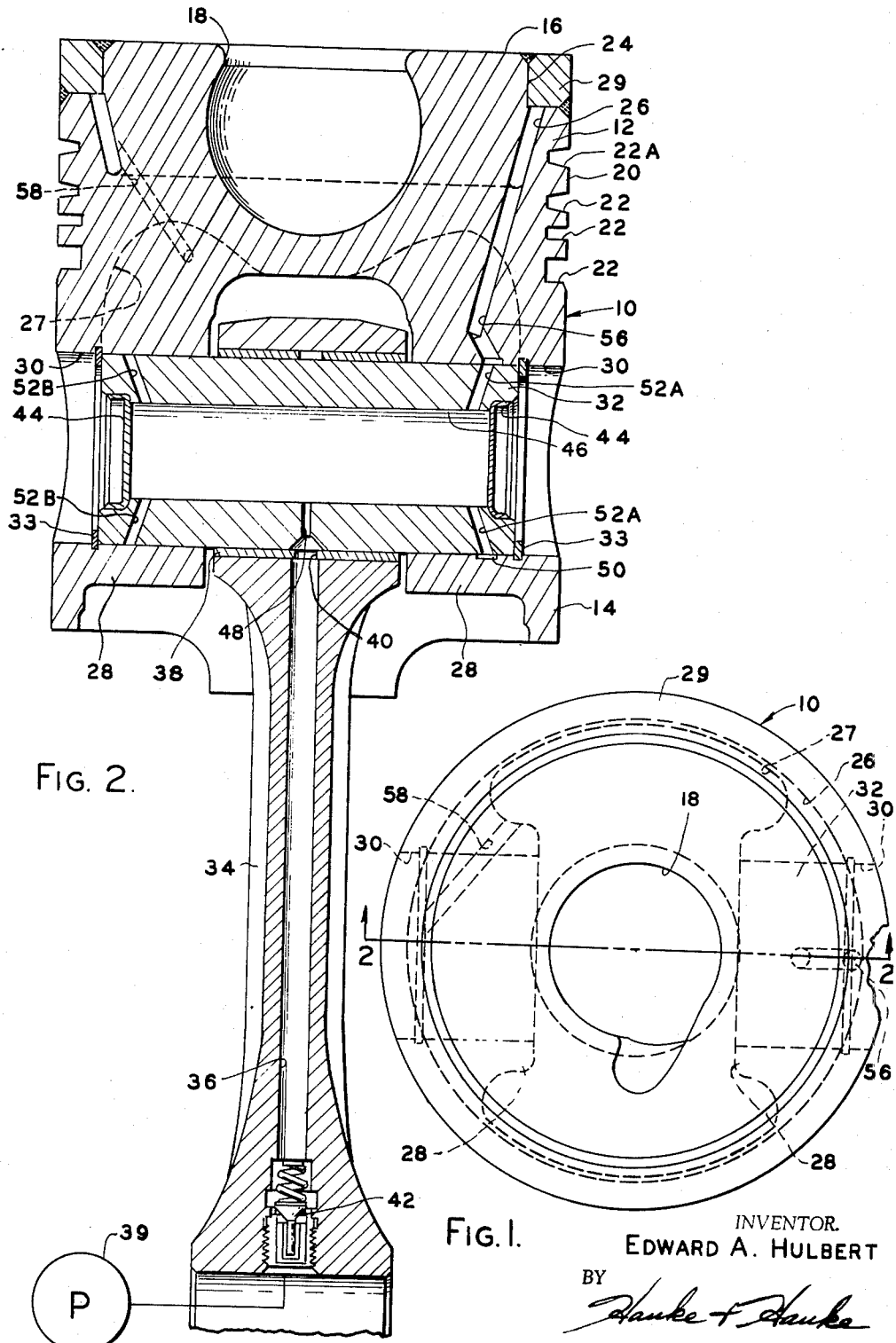

Edward A. Hulbert, Grosse Pointe, Mich., assignor to Continental Aviation and Engineering Corporation, Detroit, Mich., a corporation of Virginia
Filed Dec. 9, 1963, Ser. No. 328,996
1 Claim. (Cl. 123—41.38)

The present invention relates to internal combustion engines and more particularly a piston assembly for such engines provided with means for cooling the piston in the ring groove area.

The present invention is especially applicable to those internal combustion engines in which the combustion chamber is arranged entirely or substantially within the face of the piston although as the description proceeds, it will be apparent that the construction of the present invention can be used with other types of pistons as well.

The advantages of providing the combustion chamber within the face of the piston have been known for some time. The most desirable shape for such a combustion chamber is in the form of the major portion of a spherical hollow space or cavity extending well into the face of the piston.

Because the combustion chamber extends below the ring groove area of the piston and is separated from this area by a relatively thin wall of material, the intense heat produced in the combustion chamber is readily transmitted to the ring groove area. High temperatures in this area will cause the piston rings to warp or distort and if the temperatures are above the coking temperatures of the oil being used to operate the engine, deposits will be produced especially in the area of the top ring groove. Either of these conditions will produce scoring of the cylinder.

The present invention overcomes this problem by providing an annular cavity intermediate the combustion chamber and the ring groove area and means operable to circulate a cooling fluid through this cavity during operation of the engine.

It is an object then of the present invention to produce a more efficient internal combustion engine by providing a piston having an annular cavity closely adjacent the ring groove area of the piston and means for circulating a coolant through the cavity.

It is another object of the present invention to cool the ring groove area of a piston having the combustion chamber entirely or substantially within the face of the piston by providing an annular cavity intermediate the combustion chamber and the ring groove area and means for circulating a cooling fluid therethrough.

Still further objects and advantages of the present invention will readily occur to one skilled in the art to which the invention pertains upon reference to the following drawings in which like reference characters refer to like parts throughout the several views and in which FIG. 1 is a top elevational view of a preferred piston of the present invention, and FIG. 2 is a cross sectional view of a preferred piston assembly of the present invention taken substantially on line 2—2 of FIG. 1 and with some parts illustrated schematically for purposes of clarity.

Description

Now referring to the drawings for a more detailed description of the present invention, a preferred piston 10 is illustrated as comprising a head 12 and a skirt 14. The head 12 is provided with a face 16 and a substantially spherical combustion chamber cavity 18 and is formed in the head 12 and is intersected by the face 16 as shown. The substantially annular surface 20 of the head 12 is provided with a plurality of axially spaced ring grooves 22 and a top ring groove 22A. Each of the grooves 22 and 22A is adapted to carry a conventional piston ring (not shown). An annular recess 24 is provided at the jucture of the surface 20 and the face 16. A substantially annular cavity 26 is provided in the head 12 and preferably extends from the recess 24 angularly inwardly to terminate in a plane below the top ring groove 22 as can best be seen in FIG. 2. A ring member 29 is preferably welded in the recess 24 to close the cavity 26.

The skirt 14 is preferably hollow as shown to provide a recess 27. Wrist pin bosses 28 extend radially inwardly from opposite sides of the recess 27, and are provided with axially aligned openings 30. A wrist pin 32 is carried in the openings 30 by a pair of snap rings 33 and a connecting rod 34 is connected with the wrist pin 34 in the conventional manner.

As can best be seen in FIG. 2, the connecting rod 34 is preferably provided with a longitudinal passage 36. A bearing 38 is provided between the connecting rod 34 and the wrist pin 32 and the passage 36 communicates with an annular groove 40 provided in the bearing 38 and encompassing the wrist pin 32. The opposite end of the passage 36 is adapted for connection to the oil pump 39 of the engine so that oil under pressure is delivered through the passage 36 to the groove 40. A check valve 42 is preferably provided in the passage 36 as shown.

The wrist pin 32 is preferably hollow as shown and is closed by end caps 44 to provide a chamber 46. An orifice 48 communicates with the chamber 46 and is positioned to register with the groove 40.

One of the wrist pin bosses 28 is provided with an annular recess 50 axially aligned with the openings 30 and encompassing the wrist pin 32.

A plurality of substantially radially extending orifices 52A–B are provided in the wrist pin 32. The orifices 52A register with the recess 50. A passage 56 provided in the head 12 provides communication between the lower portion of the cavity 26 and the annular recess 50. A second passage 58 provided in the head 12 in a position substantially opposite that of the passage 56 registers with the upper portion of the cavity 26 and angles through the wrist pin boss 28 to the recess 27 provided in the skirt 14 of the piston 10.

It is apparent that a coolant preferably in the form of oil from the oil pumping means 39 of the engine is pumped through the passage 36 provided in the connecting rod 34 and is pumped into the cavity 26 by means of the passage 56. After circulation through the cavity 26 the oil returns to the crankcase of the engine (not shown) through the passages 58. This provides oil cooling in the vicinity of the top ring groove 22 to reduce ring groove temperature and to eliminate groove deposits by maintaining temperatures in this area below the coking temperature of the oil being used.

It is also apparent that although I have described but one embodiment of the present invention many changes and modifications can be made without departing from the spirit of the invention as expressed by the appended claim.

I claim:

In an internal combustion engine a piston assembly comprising (a) a piston member, a wrist pin journaled in said piston member and a connecting rod connected with said wrist pin, (b) said piston member comprising a head portion having an upper planar face and an annular exterior surface extending on an axis substantially normal with respect to said face, (c) said annular surface being provided with a plurality of axially spaced annular piston ring grooves, (d) said face being provided with a substantially spherical combustion chamber extending into said head portion and spaced from said annular surface,
(e) an annular recess being provided in said head portion at the juncture of said face and said annular surface, said recess being disposed radially outwardly from said combustion chamber and axially upwardly from said piston ring grooves,
(f) an axially elongated annular cavity registering with said recess and positioned in said head portion intermediate said combustion chamber and said piston ring grooves,
(g) a passage provided in said head portion and extending from said cavity axially through said piston member,
(h) communicating passages provided in said connecting rod and said wrist pin in registry with said head portion passage,
(i) a ring member carried in said recess and secured to said head portion to close said cavity,
(j) said communicating passages being adapted for connection to a source of cooling fluid under pressure whereby cooling fluid is delivered to said cavity, and
(k) an outlet provided in said head portion communicating with said cavity.

References Cited by the Examiner

UNITED STATES PATENTS

| | | | |
|---|---|---|---|
| 2,369,906 | 2/45 | Moore | 123—41.38 |
| 2,446,348 | 8/48 | Webster | 123—41.38 |
| 2,742,883 | 4/56 | Smith | 123—41.38 |

FOREIGN PATENTS 1,149,231  7/57  France.

KARL J. ALBRECHT, *Primary Examiner.*